United States Patent
Dean et al.

(10) Patent No.: US 12,014,266 B1
(45) Date of Patent: Jun. 18, 2024

(54) SYSTEMS AND METHODS FOR OPTIMIZED DATA STORAGE AND ANALYSIS BASED ON COGNITIVE EMULATION

(71) Applicant: Illuscio, Inc., Culver City, CA (US)

(72) Inventors: Kevin Edward Dean, Greenwood, IN (US); Joseph Nordling, Roeland Park, KS (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/598,567

(22) Filed: Mar. 7, 2024

(51) Int. Cl.
*G06N 3/063* (2023.01)
(52) U.S. Cl.
CPC .................... *G06N 3/063* (2013.01)
(58) Field of Classification Search
CPC ...................................... G06N 3/063
USPC ........................................ 706/15
See application file for complete search history.

(56) References Cited

U.S. PATENT DOCUMENTS

| 10,546,233 B1 * | 1/2020 | Bhattacharyya ....... G06N 3/063 |
| 11,670,052 B1 | 6/2023 | Dean |
| 11,804,013 B1 | 10/2023 | Dean |

* cited by examiner

*Primary Examiner* — Tan V Mai
(74) *Attorney, Agent, or Firm* — Ansari Katiraei LLP; Arman Katiraei; Sadiq Ansari (57) ABSTRACT

A cognitive modeling system uses a cognitive model to efficiently execute a variety of tasks over large datasets. The cognitive modeling system receives an input dataset and a query specifying a task to execute in relation to the input dataset. The cognitive modeling system determines an amount of similarity between each child node of the cognitive model and one or more of the input dataset and the query, selects a particular child node with the most determined amount of similarity, and executes the task using the particular child node. The task execution includes searching the particular child node for a connected set of neurons that match a particular part of the input dataset by a threshold amount, and applying an output that is associated with the connected set of neurons to the particular part of the input dataset.

20 Claims, 7 Drawing Sheets

SYSTEMS AND METHODS FOR OPTIMIZED DATA STORAGE AND ANALYSIS BASED ON COGNITIVE EMULATION

BACKGROUND

Neural networks and deep learning models operate over massive datasets to perform myriads of complex tasks. For instance, the neural networks and deep learning models may be trained based on the massive datasets to perform segmentation, classification, recognition, generative, and/or other complex tasks.

As the datasets grow, the complexity of the neural networks and deep learning models increases often at the expense of computational efficiency. In a Convolutional Neural Network (CNN) or a feed-forward neural network, each neuron in one layer of the neural network is connected to all neurons in the next layer. As the number of neurons increases to account for new or different variables or elements found within larger and larger datasets so too does the time associated with traversing through each of the layers. The traversal time increases the time for that CNN or feed-forward neural network to generate a prediction or output for the task on which that CNN or feed-forward neural network is trained to perform.

Accordingly, there is a need for more efficient data storage and data analysis. More specifically, there is a need for models to perform segmentation, classification, recognition, generation, and/or other complex tasks using new data structures and data analysis techniques that optimize access and/or analysis of massive datasets.

DETAILED DESCRIPTION OF PREFERRED EMBODIMENTS

The following detailed description refers to the accompanying drawings. The same reference numbers in different drawings may identify the same or similar elements.

Disclosed are systems and associated methods for optimized data storage and analysis based on cognitive emulation. The systems and methods define and use cognitive data structures as part of a cognitive model to perform complex tasks involving massive datasets in less time than existing neural networks and deep learning models.

The cognitive data structures are defined to emulate human memory. Each cognitive data structure may be split or partitioned for memory or data storage and for cognitive function or processing of the stored data. Specifically, each cognitive data structure is defined as a collection of neurons involving different neuron types. The neurons store data and functions associated with the processing of the data.

The cognitive model provides a mutable tree structure for accessing the relevant cognitive data structures via a single downward tree traversal and/or one or more lateral tree traversals. The mutable tree structure of the cognitive model has different branches that are linked to different optimized search trees. Each optimized search tree may use an Approximate Nearest Neighbor (ANN) or another search algorithm for efficiently accessing or traversing the neurons of one or more of the cognitive data structures. More specifically, each branch of the cognitive model (e.g., an ANN that is linked to one or more of the cognitive data structures) is trained and/or configured to perform a different segmentation, classification, recognition, or other task over different types of three-dimensional (3D) content and/or other large datasets. For instance, different branches of the cognitive model may be used to classify different objects represented by different sets of points within a point cloud and to automatically segment the different sets of points for animation, editing, or other processing.

Figure 1:
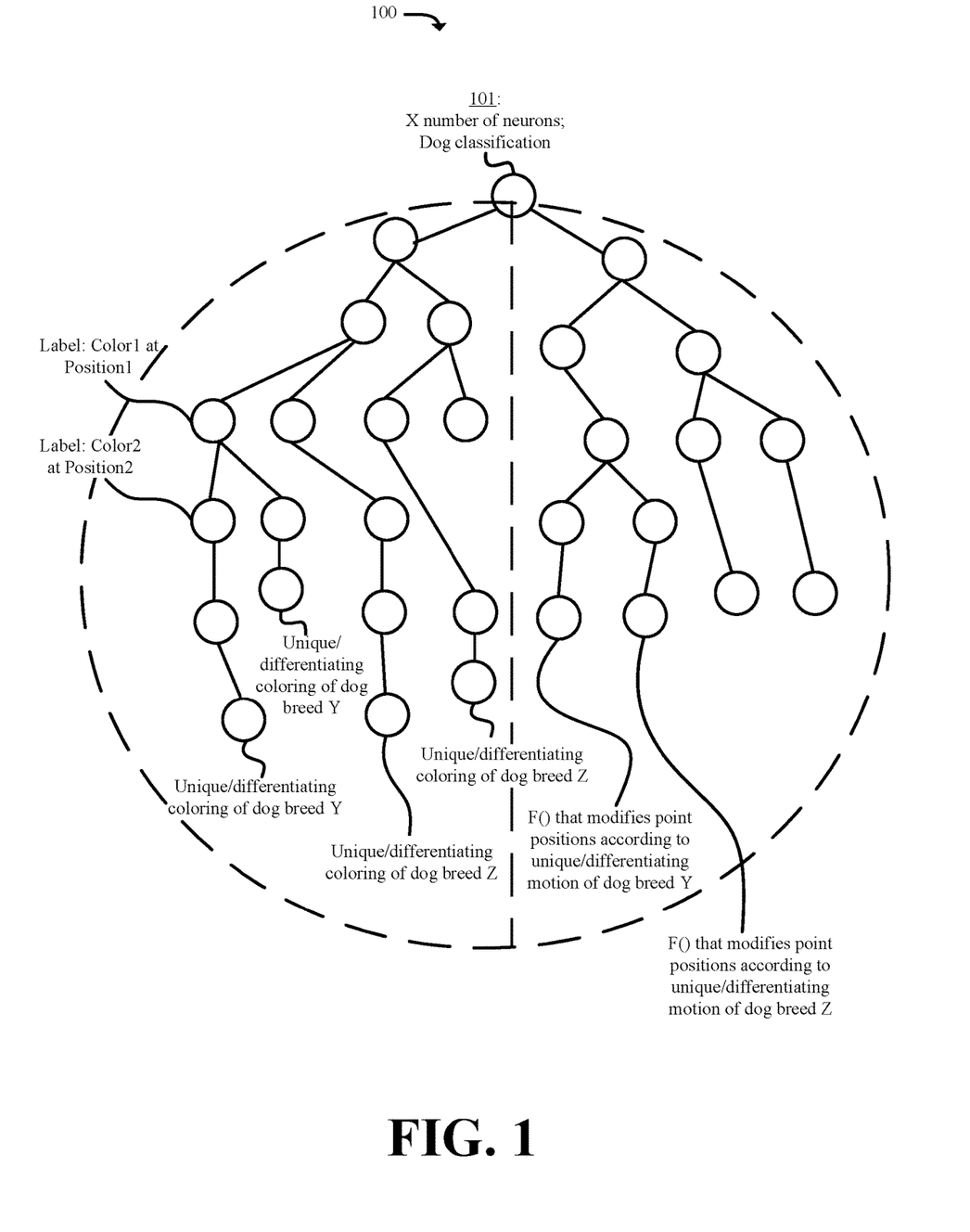
FIG. 1 illustrates an example of a cognitive data structure for some embodiments presented herein.

FIG. 1 illustrates an example of cognitive data structure 100 for some embodiments presented herein. Cognitive data structure 100 is defined with one or more nuclei.

Each nucleus is formed from a collection of neurons that represent a single concept or idea. The nucleus contains high-level information about the collection of neurons. For instance, root neuron 101 of the nucleus may store the number of neurons forming that nucleus, one or more labels or identifiers for the different data stored or represented by the neurons, and/or one or more labels or identifiers for the different functionality that may be performed over the stored data. In some embodiments, the labels or identifiers of a first nucleus may specify that the collection of neurons and/or the first nucleus represents unique or differentiating features or characteristics of a humanoid character, and the labels or identifiers of a second nucleus may specify that the collection of neurons and/or the second nucleus represents unique or differentiating features or characteristics of a specific animal (e.g., different kinds of cats).

Different types of neurons may be defined as part of one nucleus. A first set of neurons (e.g., sensory neurons) may store data for the unique or differentiating features or characteristics for identifying, classifying, segmenting, or recognizing a particular object within 3D content. For instance, the first set of neurons may store the positions, colors, materials, and/or other data for a set of point cloud points or other 3D primitives (e.g., meshes or polygons) that may be used to accurately segment, classify, or recognize one object or feature in 3D content. A second set of neurons (e.g., motor neurons) may store functions for how the first set of neurons may change over time or over an animation of the particular object represented by the collection of neurons. In some embodiments, the second set of neurons store segmentation or location information for the particular object. For instance, the second set of neurons store information about shapes or edges formed by different subsets of the first set of neurons and/or shapes or edges of the particular object that may have different structural patterns or different color commonality or variation. The nucleus may include additional neuron types including neurons that are defined based on normals for surfaces or primitives of 3D content. In any case, the nucleus may be partitioned to include neurons for storage or memory and neurons for cognitive function using the stored data or memories.

The nucleus and the definition of the neurons for that nucleus may be applied to different datasets and may be customized according to the data that is used in performing tasks on which the cognitive model is trained. In some embodiments, the neurons of a nucleus may be defined with the unique positional and/or non-positional characteristics that differentiate one object (e.g., a face, a tree, a table, a German Shepherd breed, a Golder Retriever breed, etc.) from other objects when that nucleus is used with a cognitive model that performs object detection, segmentation, classification, and/or identification operations. For instance, a first linked subset of neurons may specify coloring that is unique to differentiating a particular breed of dog from other breeds, a second linked subset of neurons may specify positioning or posturing that is unique to differentiating that particular breed of dog from other breeds, and a third linked subset of neurons may specify motion of the particular breed of dog that is unique and different from motion of other dog breeds. Alternatively, the neurons may correspond to individual primitives of a 3D content that are defined with the one or more of the unique positional and/or non-positional characteristics, and the connections between the neurons may establish a pattern or commonality amongst a set of primitives that collectively define the unique positional and/or non-positional characteristics of the object. In other words, the unique differentiating characteristics of the object may be not represented with the position or color values of a single point cloud point or a randomly sampled set of points from the point cloud. Instead, the nucleus may define the set of points that collectively form a specific structural pattern with or without a specific coloration across the surface of that specific structural pattern. Accordingly, the neurons may represent individual meshes or polygons of a 3D mesh model, points of a point cloud, pixels of a two-dimensional (2D) image, pixels of a video or animation, alphanumeric characters in a document or file, molecules or deoxyribonucleic acid (DNA) strands of a living organism, patterns of a physical fingerprint, facial features for differentiating different people or faces, and/or any other set of data that the cognitive model uses for object classification, segmentation, generation, and/or other tasks. Accordingly, for a segmentation or classification task performed by the cognitive model, different nuclei may be defined with neurons that represent the unique identifying features or characteristics of different objects.

In some embodiments, the neurons of cognitive data structure 100 are defined and connected as a binary tree. In some other embodiments, the neurons are defined and connected using different tree structures (e.g., octree, K-dimensional tree, etc.) or are linked to one another based on a modeling of features or characteristics that are represented by the nucleus.

The neurons of cognitive data structure 100 differ from neurons of a traditional neural network. The neurons of a traditional neural network have no label or identifier that indicates what that neuron in the neutral network represents or the role of that neuron within the overall neural network. Instead, one has to traverse the path of neurons within the neural network to determine the contribution that each neuron makes to the prediction or output. Conversely, the neurons of cognitive data structure 100 may be associated with one or more labels or identifiers. Also, the neurons of cognitive data structure 100 may be connected to different numbers of neurons rather than all neurons in a next layer to allow for more efficient traversal of a nucleus and to more efficiently arrive at a segmentation, classification, recognition, or other result, prediction, or output.

The cognitive model provides a mutable tree structure for rapidly accessing relevant nuclei that perform one or more requested tasks. The mutable tree structure allows the cognitive model selective and/or parallel access to different nuclei. For example, the cognitive model may simultaneously compare an input dataset against different nuclei in order to determine if the input dataset has the unique characteristics of different objects represented by the different nuclei. In this example, the cognitive model may perform a parallel classification of the input dataset against the unique characteristics of the different objects.

Moreover, since each nucleus is defined with the high-level information about the collection of neurons contained by that nucleus (e.g., metadata), the cognitive model may execute the input dataset against a dynamically selected subset of nuclei that are relevant to the input dataset and/or the task that is to be performed on the input dataset. For instance, if the task being executed involves identifying an animal in an input dataset (e.g., an image or 3D content), the cognitive model may select and feed the input dataset to the subset of nuclei that store the unique characteristics of animals, and may ignore or avoid providing the input dataset to other nuclei that store the unique characteristics of inanimate objects (e.g., buildings), mechanical or man-made objects, landscape or environmental objects (e.g., trees, plants, etc.), humanoid objects, and/or objects other than animals.

Figure 2:
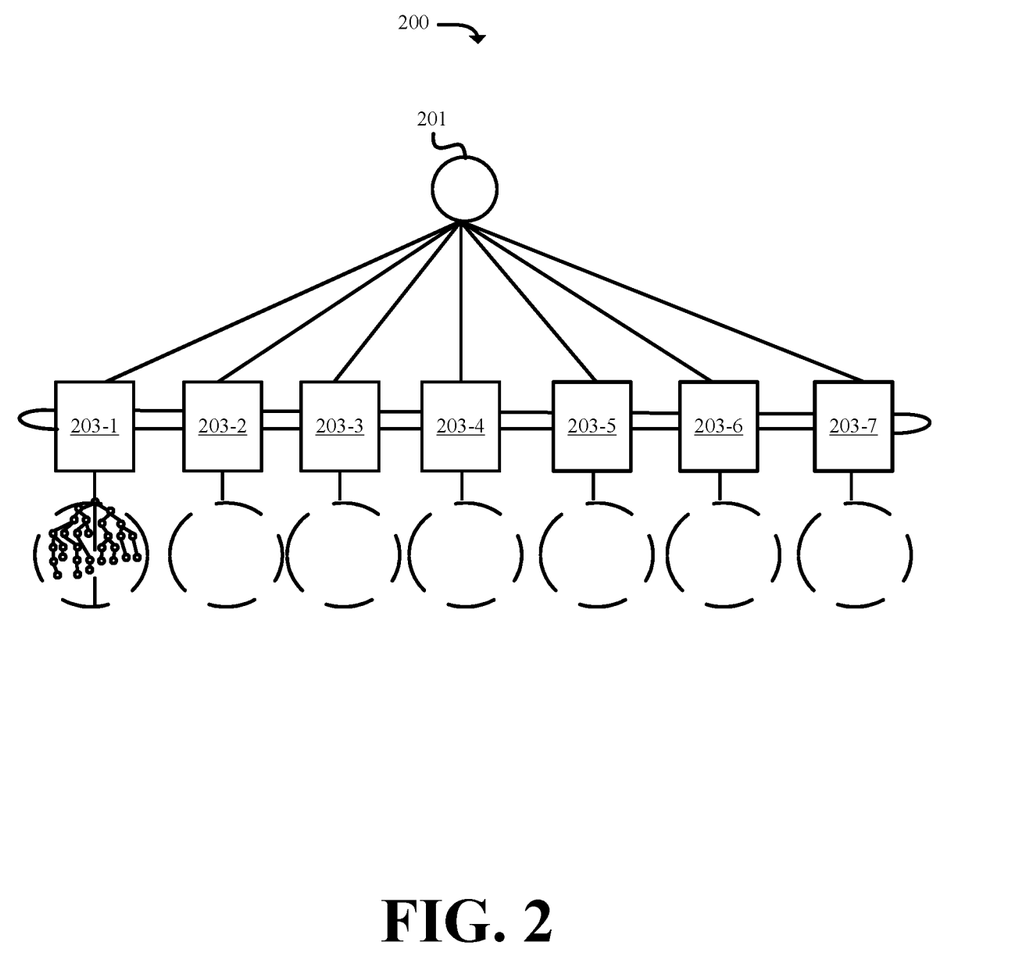
FIG. 2 illustrates an example architecture for a cognitive model in accordance with some embodiments presented herein.

FIG. 2 illustrates an example architecture for cognitive model 200 in accordance with some embodiments presented herein. Cognitive model 200 is defined with a mutable tree structure or nested tree structure.

Cognitive model 200 includes root or immutable head node 201. Multiple branches extend off of root node 201. Each branch connects root node 201 to children nodes 203-1, 203-2, 203-3, 203-4, 203-5, 203-6, and 203-7 (hereinafter collectively referred to as "children nodes 203" or individually as "child node 203").

Each child node 203 may be defined with one or more nuclei and an optimized search technique or methodology for traversing the neurons of the one or more nuclei according to a search or query parameters. In some embodiments, children nodes 203 represent ANN search trees, binary search trees, or other tree-based search algorithms for efficiently traversing through the neurons of an attached nucleus. In other words, children nodes 203 represent tree structures that are nested under root node 201 of cognitive model 200, that are linked to one or more different nuclei, and/or that are traversed according to an ANN or other search tree algorithm defined for the corresponding child node 203.

In some embodiments, a child node 203 may be defined with its own linked list of search tree structures or grandchildren nodes. In some such embodiments, the task performed by that child node 203 is partitioned into a set of subtasks for more efficient execution. For instance, a child node 203 may be defined with a nucleus for classifying different dog breeds. As the number of dog breeds increases, the nucleus becomes increasing more complex with more neurons for differentiating between the dog breed differences. An ANN or other search through such a nucleus becomes less and less efficient as more and more neurons are considered to complete the classification task. However, the child node 203 and the associated nucleus may be split into multiple nuclei that are accessible from the child node 203 via a linked list. The nuclei may partition the dog breed classification task into subtasks for classifying large dog breeds separate from small dog breeds or long-coat breeds from short-coat breeds as some examples. In other words, a first nucleus may define the unique differentiating characteristics of a small dog breeds and a second nucleus may define the unique differentiating characteristics of large dog breeds. The first nucleus and second nucleus may be linked under the same child node 203 and may be linked to one for direct lateral traversal. Accordingly, when an image or 3D model is provided to cognitive model 200, cognitive model 200 may perform a first high-level determination that the image or 3D model represents a dog, and traverses down to the child node 203 for dog classifications. A second high-level determination is made to determine whether the dog in the image or 3D model is a small or large dog, and then a ANN or search is conducted over one of the first nucleus or the second nucleus based on the second high-level determination for a specific dog breed classification.

The mutable tree structure of cognitive model 200 results from children nodes 203 being connected to root node 201 and also to one another. The connections between children nodes 203 allows for lateral traversals between children nodes 203 in the child node layer without lateral traversals back to root node 201. Accordingly, cognitive model 200 may perform a single downward traversal to first child node 203-1 in the child node layer, determine if first child node 203-1 is attached to a relevant nucleus for the task being performed, begin execution of the task via the ANN search or other downward traversal through the nucleus of first child node 203-1 if the nucleus is determined to be relevant, perform a lateral traversal from first child node 203-1 to a next child node (e.g., children nodes 203-2 and/or 203-7) in the child node layer, determine if the next child node 203 is attached to a relevant nucleus of the task being performed, being execution in response to determining that the nucleus of the next child node 203 is relevant, and continue the lateral traversals until the nuclei of all children nodes 203 have been examined for relevance or while the task remains incomplete.

The mutable tree structure of cognitive model 200 also results from the ability to reorganize or reposition children nodes 203 for more efficient task execution. For instance, child node 203-2 and child node 203-6 may perform a similar classification task (e.g., classify different four-wheeled vehicles). The mutable tree structure allow cognitive model 200 to be optimized by repositioning child node 203-2 next to child node 203-6 or by defining a direct lateral traversal between children nodes 203-2 and 203-6 so that if a four-wheeled vehicle in an image cannot be first classified by child node 203-2, a next classification is attempted using child node 203-6.

Cognitive model 200 and the association of different nuclei to different children nodes 203 divides or partitions segmentation, classification, recognition, and/or other complex tasks. For instance, an overall classification task may be divided between multiple children nodes 203 with each child node 203 being associated with a different nucleus for classifying a different object and with each child node 203 containing a label for that different object classification. More specifically, each child node 203 may inherent the label of the one or more nuclei that are defined as part of that child node 203. The labels specify the relevance of each child node 203 with respect to an overall task, and cognitive model 200 may reference the labels in determining which children nodes 203 to select and use for conditioned or specific task execution. Accordingly, if the query associated with the input dataset limits the classification to a particular object group or type, cognitive model 200 may select and perform the classification using only the children nodes 203 with a relevant label for that particular object group or type.

Tasks are executed by traversing through the nuclei of selected children nodes 203 via ANN or other traversal techniques defined for the selected children nodes 203, and by determining if characteristics, properties, or other values of an input dataset (e.g., an image, video, animation, document, etc.) match by a threshold amount to the definition of a set of neurons in the traversed nucleus. In response to detecting a match, the input dataset may be classified, segmented, modified, or otherwise processed according to the matched set of neurons.

Figure 3:
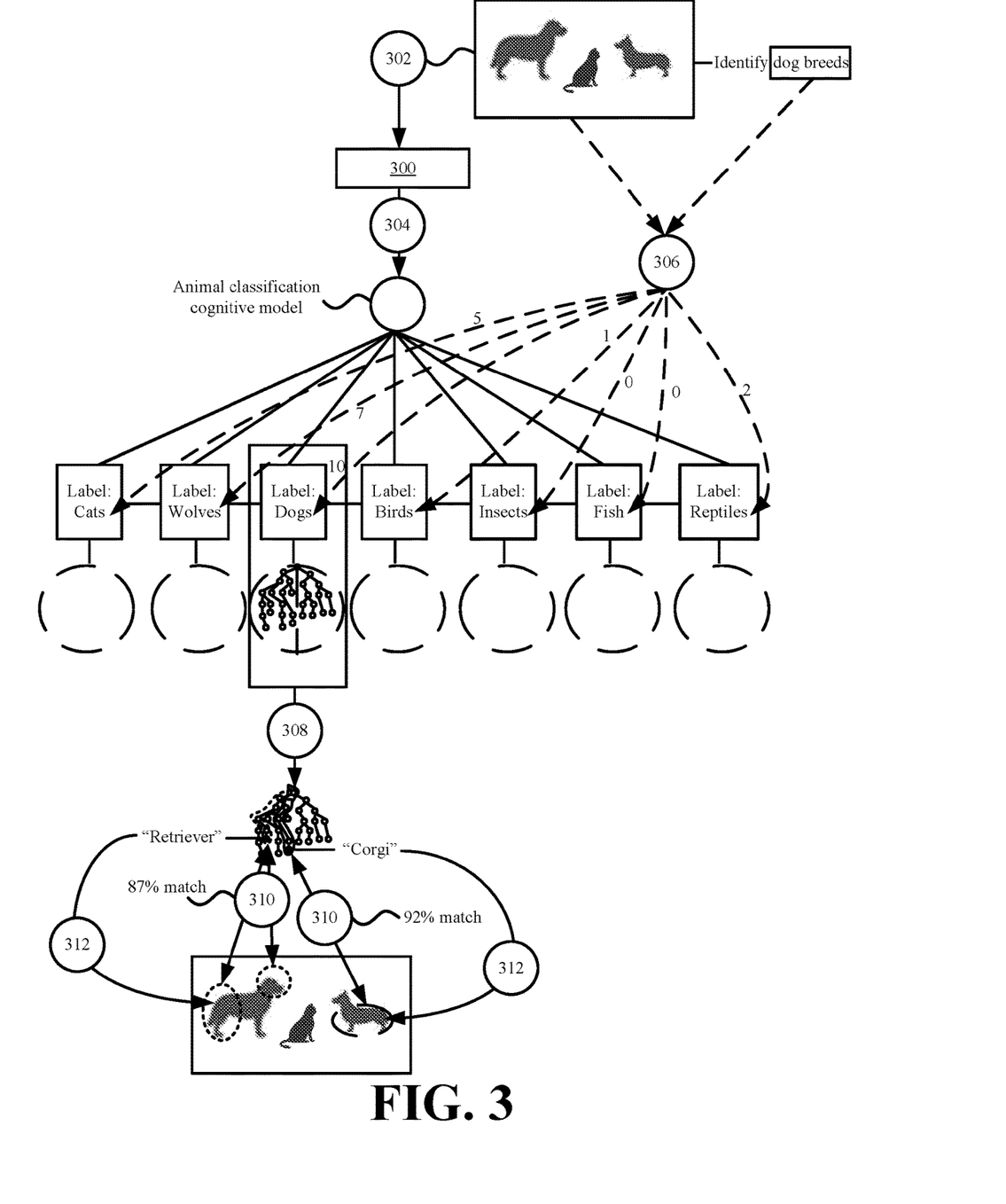
FIG. 3 illustrates an example of performing classification using the cognitive model in accordance with some embodiments presented herein.

FIG. 3 illustrates an example of performing classification using the cognitive model in accordance with some embodiments presented herein. Cognitive modeling system 300 receives (at 302) an input dataset with a query to classify the one or more objects represented within the input dataset. The input dataset may be a 2D image, 3D content in the form of a mesh model, point cloud, or other 3D format, a video, text, or a file that is encoded with values for verbal, audio, visual, or other representation of the one or more objects. In this example, the input dataset is an image with different animals, and the query requests a classification of the dog breeds in the image.

Cognitive modeling system 300 selects (at 304) a cognitive model that is defined for the classification task specified in the query. For instance, a first cognitive model may be defined for inanimate object classification, a second cognitive model may be defined for classifying facial features, and a third cognitive model may be defined for animal classification. Cognitive modeling system 300 may select (at 304) the correct cognitive model based on a label that is associated with the root node of the cognitive model and that matches or is relevant to the query or task specified as part of the query.

Cognitive modeling system 300 measures (at 306) a distance between the objects or data of the input dataset and the "base truth" associated with each child node of the selected (at 304) cognitive model. The distance measurement may include computing the similarity or dissimilarity between the data in the input dataset and the nucleus data attached to each ANN or child node in the child node layer of the cognitive model. For instance, the input dataset and the nucleus data may be represented with different matrices and a singular value decomposition (SVD) or other matrix factorization or mathematical transformation of the matrices may determine the amount of similarity between the datasets and/or the distance between the datasets. In some embodiments, cognitive modeling system 300 measures (at 306) the distance based on the semantic similarity between the one or more labels associated with each child node and identifiers associated with the input dataset or the received query. For instance, the query may request a dog breed classification such that the distance measurement (at 306) for any children nodes with a dog, canine, or dog breed label is less than any children nodes with a label for another animal or breed.

Cognitive modeling system 300 selects (at 308) the ANN or child node having the least distance or most similarity to the input dataset. Selecting (at 308) the ANN or child node includes traversing down from the cognitive model root node to the ANN or child node with the nucleus that likely contains the classification for the input dataset based on the distance measurement (at 306).

Cognitive modeling system 300 performs (at 310) a search of the selected child node. In some embodiments, cognitive modeling system 300 uses ANN or another search tree algorithm to traverse the nucleus of the selected (at 308) child node for neurons containing values, properties, or characteristics that match or are similar to those in the input dataset. For instance, cognitive modeling system 300 determines the N-number of nearest neighbors in the nucleus of the selected (at 308) child node based on the ANN search of the nucleus. The N-number of nearest neighbors correspond to a set of neurons from the nucleus of the selected (at 308) child node with defined characteristics that match or are within a threshold of the input dataset characteristics. For instance, the ANN search involves detecting a set of neurons from the nucleus of selected (at 308) child node that have the same or similar structural positioning, color commonality, or other unique differentiating characteristics as a set of data from the input dataset.

Cognitive modeling system 300 classifies (at 312) one or more objects that are represented in the input dataset based on information that is extrapolated from the N-number of nearest neighbors. The classification (at 312) may include assigning a label, tag, or other identifier to identify each object that is represented by a subset of data from the input dataset and that is a nearest neighbor match to a set of neurons in the nucleus. The label, tag, or other identifier may derived or obtained from a classification that is associated with the nearest neighboring matching set of neurons. For instance, the distance measurement (at 306) may be used to select the child node with a nucleus for differentiating between different breeds of dogs. The nucleus may be comprised of different sets of neurons that represent the unique characteristics of each dog breed. Accordingly, each set of neurons may be associated with a different dog breed classification. The ANN search may identify a particular set of neurons from the nucleus that are the nearest neighbor match to a set of data from the input dataset, and may classify the dog breed represented by that set of data in the input dataset based on the dog breed classification that is associated with the particular set of neurons.

In some embodiments, cognitive modeling system 300 may select multiple ANNs or children nodes to use in the classification or for the task execution of the input dataset. In some such embodiments, cognitive modeling system 300 may select two or more ANNs or children nodes in which the computed distance measurements between the input dataset and the two or more ANNs is less than a threshold distance. In some other embodiments, cognitive modeling system 300 selects the ANN or child node having the least distance or most similarity to the input dataset and also selects the ANNs or children nodes that are directly accessible via a single lateral or horizontal traversal of the ANN or child node having the least distance or most similarity to the input dataset. In some such embodiments, cognitive modeling system 300 sorts or arranges the ANNs or children of the cognitive model according to similarly between nuclei of the different ANNs or children. Cognitive modeling system 300 may measure the distance (e.g., compute the similarity) between the nuclei of different children nodes and may sort or arrange the children nodes based on the measured distance. Cognitive modeling system 300 may perform additional lateral or horizontal traversals between children nodes of the cognitive model until a classification is made or the requested task is complete. Alternatively, cognitive modeling system 300 may perform additional lateral or horizontal traversals between children nodes of the cognitive model until a lateral traversal results in no classification being made or no task being performed.

Figure 4:
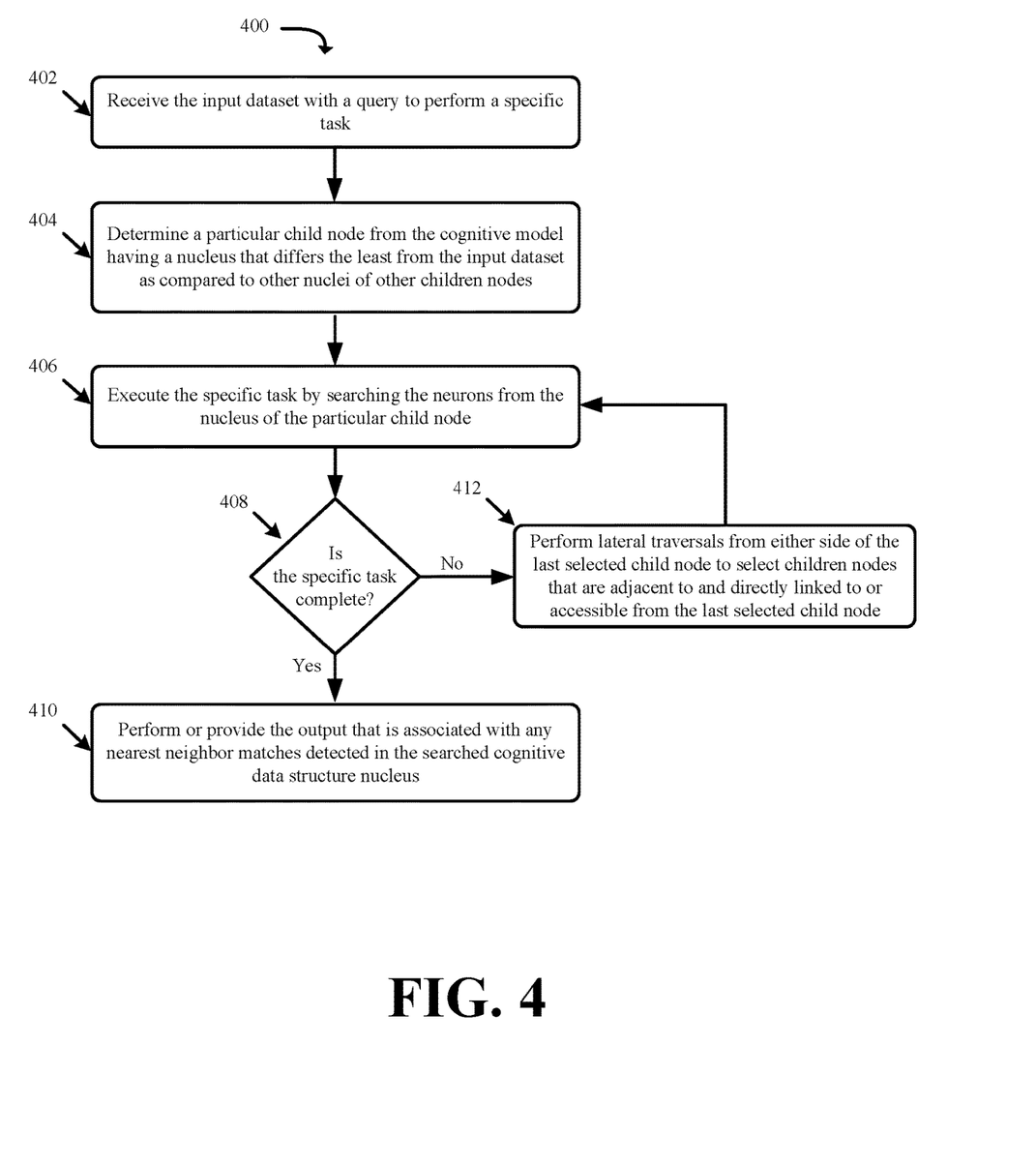
FIG. 4 presents a process for performing lateral traversals within the cognitive model for efficient task execution in accordance with some embodiments presented herein.

FIG. 4 presents a process 400 for performing the lateral traversals within the cognitive model for efficient task execution in accordance with some embodiments presented herein. The task to be executed may include classifying data from an input dataset, segmenting recognized objects from the input dataset, and/or otherwise editing differentiated objects in the input dataset. Process 400 is implemented by cognitive modeling system 300. Cognitive modeling system 300 may include one or more machines or devices with processor, memory, storage, network, and/or other hardware resources that perform different tasks using one or more cognitive models.

Process 400 includes receiving (at 402) the input dataset with a query to perform a specific task. The query may be provided in response to user input or may be generated by invocation of a specific function or functionality within a software application. In this example, the specific task requests classification of the data or objects represented in the input dataset.

Process 400 includes determining (at 404) a particular child node from the cognitive model having a nucleus that differs the least from the input dataset as compared to other nuclei of other children nodes. In some embodiments, the determination (at 404) may be based on a SVD distance calculation or other techniques for quickly quantifying and comparing two datasets. In some other embodiments, the determination (at 404) may be based by quantifying the semantic similarity between one or more words or labels in the query or the input dataset metadata and one or more words or labels associated with each nucleus.

Process 400 includes executing (at 406) the specific task by searching the neurons from the nucleus of the particular child node. The search may include traversing the nucleus via a ANN or other search for a set of neurons that are a nearest neighbor to or that match by a threshold amount to some or all the data in the input dataset. If a nearest neighbor match is found, the output associated with the nearest neighbor match in the nucleus is applied to the matching data in the input dataset. In some embodiments, the output may specify a classification label or tag to the matching data. In some embodiments, the output may specify a function or executable command to apply to the matching data. For instance, the function may specify segmenting, separating, or extracting the matching data from the input dataset or modifying the matching data via an edit, filter, effect, or other transformation that is associated with the nearest neighbor match.

Process 400 includes determining (at 408) whether the specific task is complete based on the results of search. In some embodiments, the specific task is incomplete if no set of neurons are found to match by the threshold amount to some or all of the data in the input dataset. For a classification or segmentation task, the lack of a match indicates that the data from the input dataset could not be classified or segmented based on the neurons associated with the particular child node. In some other embodiments, the specific task is incomplete if a set of neurons are found to match by the threshold to some or all of the data in input dataset. In some such embodiments, the data from the input dataset may be classified or segmented, but the specific task may remain incomplete as all the input dataset may not have been entirely classified or segmented (e.g., other sets of data representing other classifications may exist that cannot be classified using the particular child node nucleus) and process 400 may continue until no more matches are found.

In response to determining (at 408—Yes) that the specific task is complete, process 400 includes performing (at 410) or providing the output that is associated with any nearest neighbor matches detected in the searched cognitive data structure nucleus (e.g., the nucleus of the particular child node). The results may include classifications assigned to different recognized objects in the input dataset, segmentation of different sets of data from the input dataset that represent differentiated objects, and/or other tagging, editing, or modification of the input dataset.

In response to determining (at 408—No) that the specific task is incomplete, process 400 includes performing (at 412) lateral traversals from either side of the last selected child node (e.g., the particular child node) to select children nodes that are adjacent to and directly linked to or accessible from the last selected child node. Performing (at 412) the lateral traversals includes following pointers that identify the children nodes that are adjacent to or directly accessible from the particular child node or moving from the position of the particular child node in a linked list to other children nodes before and after the position of the particular child node in the linked list.

Process 400 includes continuing execution (at 406) of the specific task by searching the neurons from the nucleus of each child node that was selected as a result of performing (at 412) the lateral traversals. Accordingly, if the initially selected child node results in one or more classifications, process 400 may continue to determine if additional classifications can be made by searching the neurons of neighboring children nodes until no more classifications are made. Alternatively, if the initially selected child node does not produce a classification, process 400 may continue searching the nuclei of laterally adjacent or neighboring nodes to the initially selected child node until a classification is made.

Cognitive modeling system 300 may optimize the cognitive model for faster task execution using reinforcement learning, supervised machine learning, and/or unsupervised machine learning. The reinforcement learning, supervised machine learning, and/or unsupervised machine learning tracks the tasks that are completed and/or not completed by different children nodes in order to identify relationships between the tasks and/or the nuclei associated with each child node. Cognitive modeling system 300 may then arrange the children nodes so that nuclei for related or similar tasks are positioned next to one another and/or may be directly accessed via a single lateral traversal at the child node layer of the cognitive model. Consequently, the number of children nodes and/or nuclei that are traversed as part of the larger task execution is reduced because if the task cannot be completed using the nucleus of a first selected node that is determined to most likely contain the data for the requested task, then there is a higher likelihood that the children nodes that are directly accessible from the first selected node via a single lateral traversal contain the data for the requested task.

Figure 5:
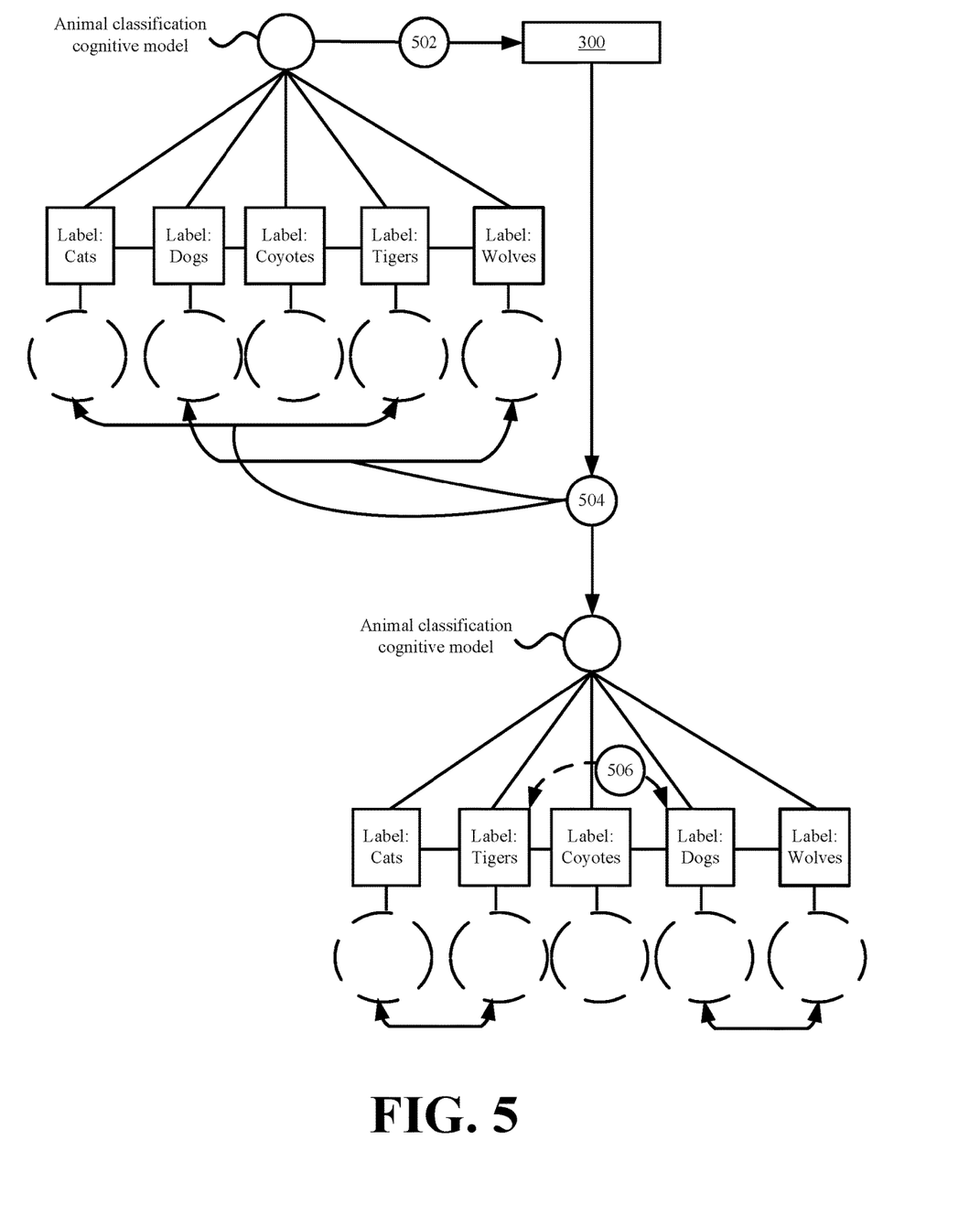
FIG. 5 illustrates an example of optimizing the cognitive model in accordance with some embodiments presented herein.

FIG. 5 illustrates an example of optimizing the cognitive model in accordance with some embodiments presented herein. Cognitive modeling system 300 retrieves (at 502) and/or generates a cognitive model with a first arrangement or organization of children nodes under the root node. Each child node may be associated with a nucleus for the unique or differentiating characteristics of different animals and for classifying, segmenting, or otherwise detecting the different animals in an input dataset. For instance, a first child node may include a cognitive data structure with a collection of neurons representing the unique characteristics that differentiate a cat from other animals, a second child node may include a cognitive data structure with a collection of neurons representing the unique characteristics that differentiate a dog from other animals, a third child node may include a cognitive data structure with a collection of neurons representing the unique characteristics that differentiate a coyote from other animals, a fourth child node may include a cognitive data structure with a collection of neurons representing the unique characteristics that differentiate a tiger from other animals, and a fifth child node may include a cognitive data structure with a collection of neurons representing the unique characteristics that differentiate a wolf from other animals.

Cognitive modeling system 300 uses reinforcement learning, supervised machine learning, or unsupervised machine learning to track the output that is produced by each child node and determine (at 504) relationships or similarities in the outputs produced by the children nodes. For instance, cognitive modeling system 300 determines that the first child node for classifying cats and the fourth child node for classifying tigers are related based on the percentage of nearest neighbor matches produced by each child node increasing and decreasing for the same input datasets as cats and tigers share more characteristics and features in common than the other animals represented by the other children nodes. Similarly, cognitive modeling system 300 determines that the second child node for classifying dogs and the fifth child node for classifying wolves are related based on the percentage of nearest neighbor matches produced by each child node increasing and decreasing for the same input datasets as dogs and wolves share more characteristics and features in common than the other animals represented by the other children nodes.

Cognitive modeling system 300 optimizes the cognitive model by rearranging (at 506) the children nodes so that direct lateral traversals may be made between the children nodes with determined (at 504) relationships or similarities. The rearranging of the children nodes based on the determined (at 504) relationships or similarities minimizes the number of children nodes that are searched when a task remains incomplete after searching an initially selected child node. For instance, if the object represented in an image has a high likelihood of being classified as a dog but does not result in a dog classification after searching the nucleus of the second child node, then the next likeliest classification would be of a wolf which is determined to have many of the same characteristics or features as dogs via the reinforcement learning. However, in the original arrangement of the cognitive model, the first child node for cat classifications and the third child node for coyote classifications are directly accessible from the second child node for dog classifications. Searching the first child node for cat classifications and the third child node for coyote classifications would have a lower likelihood of producing the desired output than searching the fifth child node for wolf classification and would therefore delay the task completion by unnecessarily searching unrelated children nodes. The optimized arrangement of the cognitive model places the child node for wolf classifications directly adjacent to the child node for dog classifications to eliminate the unnecessary searching of unrelated nuclei and to search for a wolf classification should the input dataset not contain a dog classification after an initial measure of the distance between the input dataset and the child node for a dog classification being less than the distance measure the input dataset and all other children nodes.

Cognitive modeling system 300 may further optimize the cognitive model and/or the task execution by performing an enhanced ANN searching of the selected children nodes. The ANN search may terminate before reaching a leaf neuron in a nucleus. Specifically, the ANN search may stop once a subset of neurons in the searched nucleus is determined to match by a threshold amount to a subset of data from the input dataset. However, the computations for determining when to stop the ANN search and/or when a sufficient number of neighbors have been reached adds a performance penalty to the ANN search. The enhanced ANN search eliminates or reduces the performance penalty by tracking "cousins" for the neurons in a searched nucleus. The cousins may include other neurons that contain similar or related data to a particular neuron but are not siblings of that particular neuron (e.g., not linked or accessible from a same neuron in the searched nucleus). The cousins of the particular neuron may be stored as a linked list or as a set of pointers, and therefore allow for faster searching of the nucleus via different partitioned searching of the nucleus.

In some embodiments, the reinforcement learning optimizes the cognitive model based on task complexity associated with child node, the nucleus size, and/or the required to execute the task associated with the child node. In some such embodiments, the optimization involves subdividing the nucleus into multiple nuclei that represent and/or execute different subtasks and that collectively implement the particular task of the original nucleus. For instance, cognitive modeling system 300 may monitor the performance of the task associated with each child node of the cognitive model. The complexity of a task may increase over time as the task scope is enlarged, becomes more detailed or specific, spans a larger dataset or feature set, and/or otherwise increases in complexity due to continually evolving or improving the task through artificial intelligence, machine learning, human development, and the like. Once the task performance falls below a performance threshold, cognitive modeling system 300 may partition the task and the nucleus associated with the performance of that task into two or more nuclei with each nuclei implementing a different subtask of the original task and/or producing a different subset of the results produced by the original task. The nuclei are accessible from the same child node of the cognitive model such that the same child node selection criteria used to access the original nucleus may be used to access the partitioned nuclei. However, additional selection criteria may be defined to select between the partitioned nuclei accessible from the selected child node.

Figure 6:
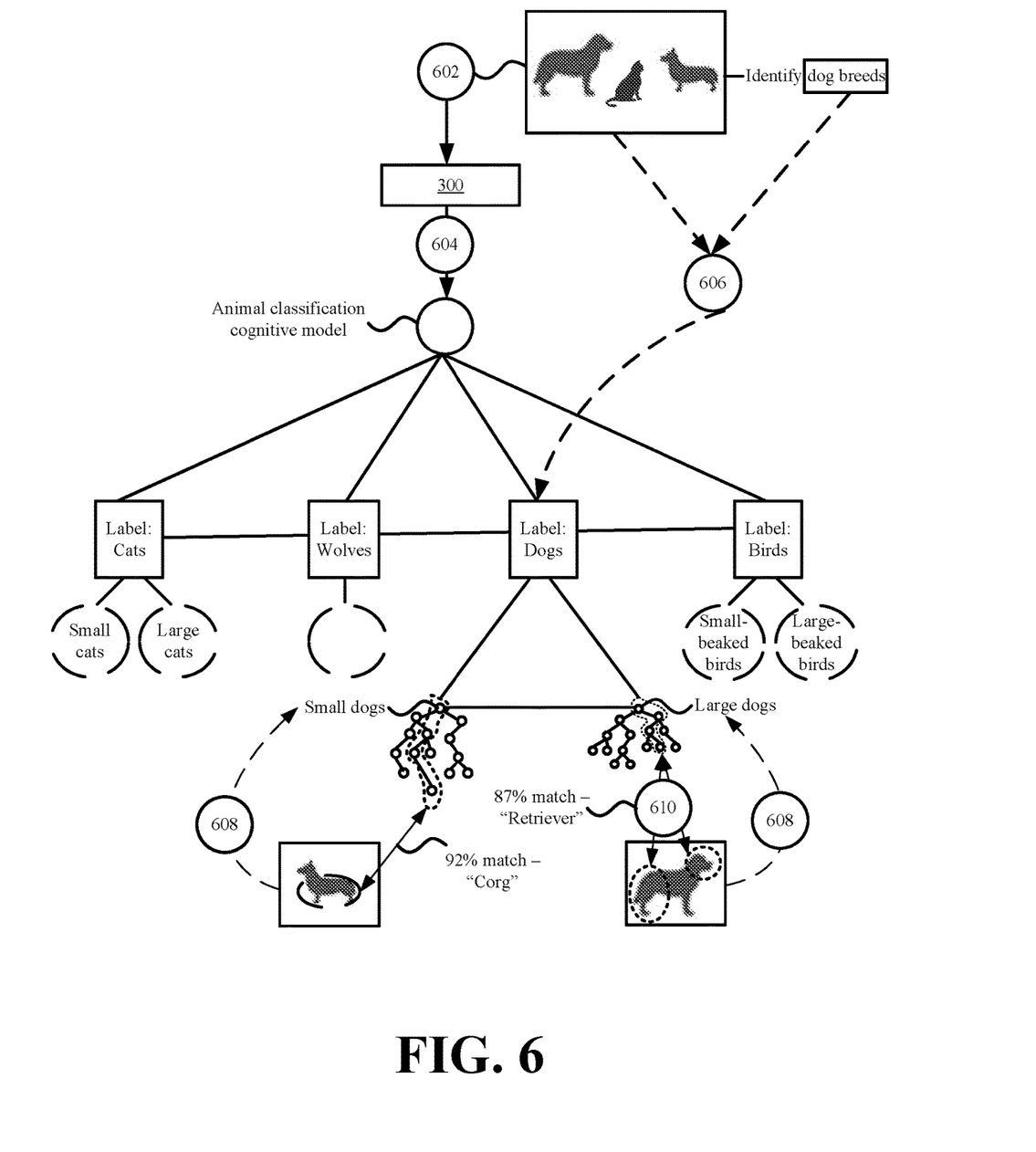
FIG. 6 illustrates an example of performing classification using a cognitive model that is optimized through a subdividing of a particular classification task in accordance with some embodiments presented herein.

FIG. 6 illustrates an example of performing classification using a cognitive model that is optimized through a subdividing of a particular classification task in accordance with some embodiments presented herein. Cognitive modeling system 300 receives (at 602) an image of different animals with a query to classify the dog breeds that are represented in that image.

Cognitive modeling system 300 selects (at 604) a cognitive model for classifying different animals. For instance, the selected (at 604) cognitive model may include a first child node for classifying cats, a second node for classifying wolves, a third child node for classifying dogs, and a fourth child node for classifying birds. As before, cognitive modeling system 300 may select (at 604) the cognitive model based on a label or metadata that is associated with the root node of the cognitive model and that matches or is relevant to the query or task specified as part of the query.

A first vertical traversal (at 606) from the root node of the selected (at 604) cognitive model to third child node is performed based on a calculated distance between the objects or data of the input dataset or wording in the query and a label or metadata associated with each child node of the selected (at 604) cognitive model. In this example, each child node includes a label that identifies the types of animal or animal species that are classified by the nucleus associated with that child node. Accordingly, cognitive modeling system 300 selects the third child node with a dog or canine label and that has the least distance or most similarity with the query for identifying the dog breeds in the inputted image.

The first child node for classifying cats, the third child node for classifying dogs, and the fourth child node for classifying birds may have their respective classification tasks partitioned into smaller or simpler subtasks and may include a different nucleus for each subtask. For instance, rather than define a single nucleus for identifying all cats, the first child node may be linked to a first nucleus defined with the unique differentiating features or characteristics of different small cats (e.g., different types of house cats) and a second nucleus defined with the unique differentiating features or characteristics of different large cats (e.g., leopards, cougars, tigers, lions, cheetahs, jaguars, etc.). Similarly, the third child node may be linked to a first nucleus defined with the unique differentiating features or characteristics of different small dogs (e.g., chihuahua, corgi, pug, Maltese, Pomeranian, etc.) and a second nucleus defined with the unique differentiating features or characteristics of different large dogs (e.g., Rottweiler, Labrador retriever, Great Dane, etc.), and the fourth child node may be linked to a first nucleus defined with the unique differentiating features or characteristics of different short-beaked birds and a second nucleus defined with the unique differentiating features or characteristics of different long-beaked birds. The splitting of the nucleus under a child node may be based on readily identifiable features or characteristics that require minimal computational effort to detect and/or that produce distinct groupings (e.g., small cats versus large cats and small-beaked birds versus large-beaked birds). The splitting of the nucleus may be performed automatically by cognitive modeling system 300 in response to the size of the nucleus exceeding a threshold, the time to search the nucleus exceeding a threshold, and/or other performance factors.

Cognitive modeling system 300 determines that the selected third child node is linked to two or more different nuclei. To select between the two or more nuclei, cognitive modeling system 300 computes (at 608) a second distance measurement based on a different subset of the image data representing each dog in the image and the labels or metadata associated with each nuclei that is accessible from the third child node. For instance, the label of the first nucleus specifies "small dogs" and the label of the second nucleus specifies "large dogs". Accordingly, cognitive modeling system 300 inspects the image for different subsets of image data having dog shapes or animal shapes and evaluates the size or shape of the animal represented in each subset of image data as small or large. Since the image contains both a small dog and a large dog, cognitive modeling system 300 selects to classify the image using both the first nucleus for small dog breed classifications and the second nucleus for large dog breed classifications. In some embodiments, cognitive modeling system 300 performs a parallel search of the first nucleus and the second nucleus using the image. Since the first nucleus and the second nucleus partition the overall dog breed classification task into subtasks for small dog breeds and large dog breeds and since the first nucleus and the second nucleus contain fewer neurons than a single larger nucleus defined to classify all dog breeds, the search and classification with the first nucleus and the second nucleus will be completed in less time than a search and classification with the single larger nucleus. In some embodiments, cognitive modeling system 300 partitions the image so that the first subset of image data identified as the small dog is classified (at 610) using the first nucleus and the second subset of image data identified as the large dog is classified (at 610) using the second nucleus.

In the case of an image with a medium sized dog, cognitive modeling system 300 may first select the first nucleus of the third child node, perform an ANN or other search between the image and the neurons of the first nucleus, and attempt to classify the dog breed in the image using the unique differentiating characteristics or features of small-sized dogs defined in the first nucleus. If the classification fails (e.g., the output classification having a probability that is less than a threshold), cognitive modeling system 300 may traverse the linked list of nuclei under the third child node, perform a lateral traversal from the first nucleus to the second nucleus of the third child node, perform the ANN or other search between the image and the neurons of the second nucleus, and attempt to classify the dog breed in the image using the unique differentiating characteristics or features of large-sized dogs defined in the second nucleus.

The cognitive models may therefore be optimized by partitioning the nucleus associated with any child node of the mutable tree into less complex nuclei with fewer neurons. The smaller nuclei may be searched or compared to an input dataset in less time such that the subtasks associated with the partitioned nuclei are completed in less time than an original task associated with an unpartitioned nucleus. Moreover, since the subtasks collectively perform the same task as the original task, the partitioned nuclei result in a faster and more efficient execution of the original task.

Figure 7:
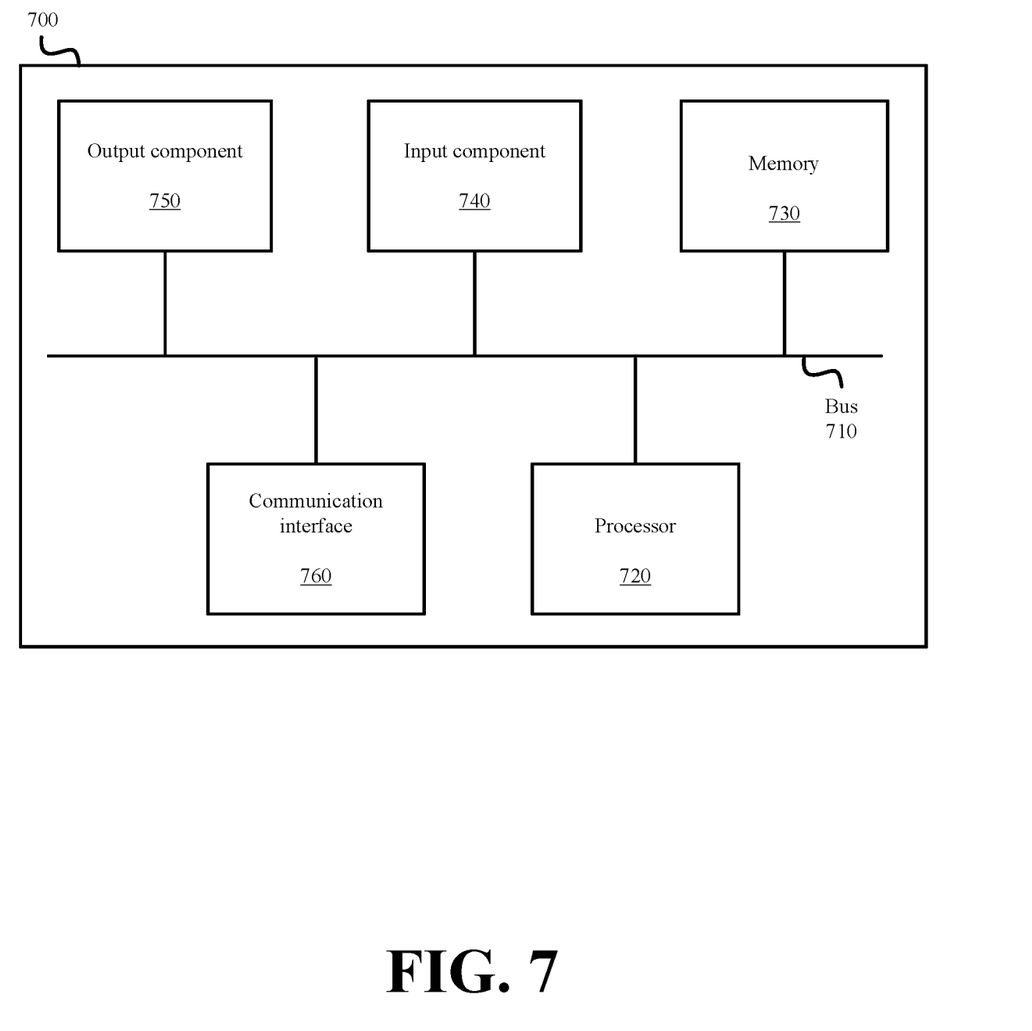
FIG. 7 illustrates example components of one or more devices, according to one or more embodiments described herein.

FIG. 7 is a diagram of example components of device 700. Device 700 may be used to implement one or more of the tools, devices, or systems described above (e.g., cognitive modeling system 300). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc.

In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving an input dataset and a query specifying a task to execute in relation to the input dataset;
   determining an amount of similarity between each child node from a plurality of children nodes of a cognitive model and one or more of the input dataset and the query;
   selecting a particular child node from the plurality of children nodes based on the amount of similarity determined for the particular child node being more than the amount of similarity determined for other children nodes of the plurality of children nodes; and
   executing the task using the particular child node, wherein executing the task comprises:
      searching a connected plurality of neurons that are associated with the particular child node;
      determining a connected set of neurons from the connected plurality of neurons that match a particular part of the input dataset by a threshold amount; and
      applying an output that is associated with the connected set of neurons to the particular part of the input dataset.

2. The method of claim 1,
   wherein receiving the input dataset comprises an image or video with one or more objects; and
   wherein applying the output comprises classifying the one or more objects represented in the particular part of the input dataset with a classification that is associated with the connected set of neurons.

3. The method of claim 1, wherein applying the output comprises:
   segmenting the particular part of the input dataset from the input dataset.

4. The method of claim 1,
   wherein searching the connected plurality of neurons comprises performing an approximate nearest neighbor search of the connected plurality of neurons; and
   wherein determining the connected set of neurons comprises determining that data associated with the connected set of neurons is a nearest neighbor match for data represented by the particular part of the input dataset.

5. The method of claim 1 further comprising:
   selecting a next child node from the plurality of children nodes that is directly accessible from the particular child node in response to the task remaining incomplete after executing the task using the particular child node;
   searching a connected plurality of neurons that are associated with the next child node; and
   applying a different output to a second part of the input dataset in response to the second part of the input dataset matching one or more neurons of the connected plurality of neurons that are associated with the next child node by the threshold amount and the different output being associated with the one or more neurons.

6. The method of claim 1 further comprising:
   determining that the task remains incomplete after executing the task using the particular child node;
   selecting a next child node from the plurality of children nodes based on the next child node being laterally connected to the particular child node; and
   continuing execution of the task using the next child node.

7. The method of claim 1 further comprising:
   determining an amount of similarity between the plurality of children nodes; and
   repositioning the plurality of children nodes under a root node of the cognitive model based on the amount of similarity between the plurality of children nodes.

8. The method of claim 7, wherein repositioning the plurality of children nodes comprises:
   defining a link between two of the plurality of children nodes that are repositioned to be adjacent to one another, wherein the link establishes directly lateral access between adjacent children nodes without an upward traversal to the root node.

9. The method of claim 1, wherein determining the amount of similarity comprises:
   determining semantic similarity between one or more labels associated with each child node of the plurality of children nodes and one or more words specified as part of the query or the input dataset.

10. The method of claim 1, wherein determining the amount of similarity comprises:
    generating a matrix representation for data contained by each child node of the plurality of children nodes and a matrix representation for data contained by the input dataset; and
    quantifying the amount of similarity based on a mathematical transformation of the matrix representation for the data contained by each child node and the matrix representation for the data contained by the input dataset.

11. A system comprising:
    one or more hardware processors configured to:

receive an input dataset and a query specifying a task to execute in relation to the input dataset;
determine an amount of similarity between each child node from a plurality of children nodes of a cognitive model and one or more of the input dataset and the query;
select a particular child node from the plurality of children nodes based on the amount of similarity determined for the particular child node being more than the amount of similarity determined for other children nodes of the plurality of children nodes; and
execute the task using the particular child node, wherein executing the task comprises:
searching a connected plurality of neurons that are associated with the particular child node;
determining a connected set of neurons from the connected plurality of neurons that match a particular part of the input dataset by a threshold amount; and
applying an output that is associated with the connected set of neurons to the particular part of the input dataset.

12. The system of claim 11,
wherein receiving the input dataset comprises an image or video with one or more objects; and
wherein applying the output comprises classifying the one or more objects represented in the particular part of the input dataset with a classification that is associated with the connected set of neurons.

13. The system of claim 11, wherein applying the output comprises:
segmenting the particular part of the input dataset from the input dataset.

14. The system of claim 11,
wherein searching the connected plurality of neurons comprises performing an approximate nearest neighbor search of the connected plurality of neurons; and
wherein determining the connected set of neurons comprises determining that data associated with the connected set of neurons is a nearest neighbor match for data represented by the particular part of the input dataset.

15. The system of claim 11, wherein the one or more hardware processors are further configured to:
select a next child node from the plurality of children nodes that is directly accessible from the particular child node in response to the task remaining incomplete after executing the task using the particular child node;
search a connected plurality of neurons that are associated with the next child node; and
apply a different output to a second part of the input dataset in response to the second part of the input dataset matching one or more neurons of the connected plurality of neurons that are associated with the next child node by the threshold amount and the different output being associated with the one or more neurons.

16. The system of claim 11, wherein the one or more hardware processors are further configured to:
determine that the task remains incomplete after executing the task using the particular child node;
select a next child node from the plurality of children nodes based on the next child node being laterally connected to the particular child node; and
continue execution of the task using the next child node.

17. The system of claim 11, wherein the one or more hardware processors are further configured to:
determine an amount of similarity between the plurality of children nodes; and
reposition the plurality of children nodes under a root node of the cognitive model based on the amount of similarity between the plurality of children nodes.

18. The system of claim 17, wherein repositioning the plurality of children nodes comprises:
defining a link between two of the plurality of children nodes that are repositioned to be adjacent to one another, wherein the link establishes directly lateral access between adjacent children nodes without an upward traversal to the root node.

19. The system of claim 11, wherein determining the amount of similarity comprises:
determining semantic similarity between one or more labels associated with each child node of the plurality of children nodes and one or more words specified as part of the query or the input dataset.

20. A non-transitory computer-readable medium storing instructions that, when executed by one or more processors of a cognitive modeling system, cause the cognitive modeling system to perform operations comprising:
receiving an input dataset and a query specifying a task to execute in relation to the input dataset;
determining an amount of similarity between each child node from a plurality of children nodes of a cognitive model and one or more of the input dataset and the query;
selecting a particular child node from the plurality of children nodes based on the amount of similarity determined for the particular child node being more than the amount of similarity determined for other children nodes of the plurality of children nodes; and
executing the task using the particular child node, wherein executing the task comprises:
searching a connected plurality of neurons that are associated with the particular child node;
determining a connected set of neurons from the connected plurality of neurons that match a particular part of the input dataset by a threshold amount; and
applying an output that is associated with the connected set of neurons to the particular part of the input dataset.

* * * * *